United States Patent
Berglund et al.

(10) Patent No.: US 6,427,176 B1
(45) Date of Patent: Jul. 30, 2002

(54) METHOD AND APPARATUS FOR MAINTAINING SYSTEM LABELING BASED ON STORED CONFIGURATION LABELING INFORMATION

(75) Inventors: Neil Clair Berglund, Kasson; Michael Alfred Goolsbey; Thomas James Osten, both of Rochester, all of MN (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/262,023

(22) Filed: Mar. 4, 1999

(51) Int. Cl.[7] .................................................. G06F 3/00
(52) U.S. Cl. .............................. 710/8; 710/62; 710/72; 710/104; 713/1; 713/100
(58) Field of Search ................................. 710/8, 10, 15, 710/20, 21, 62, 9, 72, 73, 74, 104; 713/1, 100

(56) References Cited

U.S. PATENT DOCUMENTS

| | | | | |
|---|---|---|---|---|
| 5,117,430 A | | 5/1992 | Berglund | 370/85.1 |
| 5,245,615 A | * | 9/1993 | Treu | 371/16.5 |
| 5,499,357 A | * | 3/1996 | Sonty et al. | 395/500 |
| 5,574,519 A | * | 11/1996 | Manico et al. | 396/429 |
| 5,701,429 A | * | 12/1997 | Legvold et al. | 711/114 |
| 5,754,548 A | * | 5/1998 | Hoekstra et al. | 370/402 |
| 5,907,616 A | * | 5/1999 | Brogger et al. | 380/4 |
| 5,953,515 A | * | 9/1999 | Coteus et al. | 395/500 |
| 6,122,256 A | * | 9/2000 | Berglund | 370/241 |
| 6,199,130 B1 | * | 3/2001 | Berglund et al. | 710/103 |
| 6,237,048 B1 | * | 5/2001 | Allen et al. | 710/8 |

FOREIGN PATENT DOCUMENTS

EP 0517403 A2 12/1992 ............ G06F/11/22

OTHER PUBLICATIONS

Berglund; "Method and Apparatus for Correlating Computer System Device Physical Location with Logical Address", US Patent Application 08/971,687; filed Nov. 17, 1997.

Berglund; "Fail–Safe Communications Network for use in System Power Control"; US Patent Application 08/912,561; filed Aug. 17, 1997.

* cited by examiner

Primary Examiner—Jeffrey Gaffin
Assistant Examiner—Mai Rijue
(74) Attorney, Agent, or Firm—Shanks & Herbert; Christopher H. Lynt; Matthew J. Bussan

(57) ABSTRACT

In an electrical system having subsystems, and which stores configuration labeling information therein, subsystem configuration is detected and the stored configuration labeling information is updated based thereon. Service personnel can then access the stored updated configuration labeling information to use in affixing labels at appropriate locations in the electrical system.

20 Claims, 5 Drawing Sheets

METHOD AND APPARATUS FOR MAINTAINING SYSTEM LABELING BASED ON STORED CONFIGURATION LABELING INFORMATION

CROSS-REFERENCE TO RELATED APPLICATIONS

The present application is related to application Ser. No. 08/971,687, filed Nov. 17, 1997, entitled "METHOD AND APPARATUS FOR CORRELATING COMPUTER SYSTEM DEVICE PHYSICAL LOCATION WITH LOGICAL ADDRESS" now U.S. Pat. No. 6,044,411, and to application Ser. No. 08/912,561, filed Aug. 18, 1997, entitled "FAIL-SAFE COMMUNICATIONS NETWORK FOR USE IN SYSTEM POWER CONTROL" now U.S. Pat. No. 6,122,256, both of which are assigned to the same assignee as the present application.

BACKGROUND OF THE INVENTION

1. Field of the Invention

The invention relates to the field of system maintenance, and in particular, to physical labeling of a system after a field service/upgrade.

2. Background Information

In electronic systems, such as the typical desktop personal computer systems, it is known to store certain basic system information in non-volatile memory which is commonly referred to as SRAM (static random access memory) or CMOS, because it is generally memory formed with complimentary metal oxide semiconductor technology. Of course, this type of memory is only "non-volatile" as long as a voltage is applied to it, either from the computer system power supply or from an on-board battery when the computer system is powered down. The information stored in CMOS includes hardware information, for example, system memory size, hard disk drive type and other peripheral device information. This information is sometimes manually entered by the computer manufacturer at the time the system is configured, or by a user when the system is upgraded by adding a new component. The information stored in CMOS memory is used by the computer's basic input output system (BIOS), which is a set of routines generally stored as firmware in read only memory (ROM) disposed on the computer system mother board, to establish parameters for communication between the computer system hardware, including peripheral devices, and the operating system software. Some BIOS versions have an automatic detect feature to detect a device's parameters. For example, when a new hard drive is added to the system, the user can manually configure the required parameters to be stored in CMOS memory, or the user can have the BIOS automatically detect the drive type, number of cylinders, heads, etc., of the new hard drive, for storage in CMOS. Further, some recent computer systems use what is called a "plug-and-play" (PnP) BIOS, in which the BIOS automatically detects the installation of a new device having PnP compatibility, and attempts to configure necessary input/output drivers and parameters for the device. However, in this known method, the BIOS and operating system only know the device by its logical address, and not its actual physical location. That is, it is not readily apparent to the user or service personnel from the BIOS or operating system, to which card slot on the mother board a device is physically connected. In small desktop computer systems this is not generally a concern since the number of peripherals such systems can accommodate is usually relatively small making their location relatively easy.

Typical medium to large size computer systems include at least one backplane, which is essentially a connecting board having integrated wiring and bus slots or other connectors, for interconnecting various computer system circuits designed to connect to the backplane. The backplanes connect circuits such as special purpose input-output and/or control circuits, for use in interfacing peripheral devices, for example, such as direct access storage devices (DASD's, e.g., hard disk drives), to the rest of the computer system. These circuits are generally disposed on modules or cards which have standard connectors for plug-in to backplane at bus sockets or slots, to thereby connect with the rest of the computer system by way of the backplane. This allows for easy removal, servicing, upgrading and replacement by service personnel and/or experienced users.

In large and complex electrical systems, such as large computer systems, there is a need for the operating system (OS) to be able to correlate a physical location, or 'bay', within a computer chassis with a device or subsystem at that location. This correlation is needed in order to be able to readily service or upgrade the system.

If a peripheral device, for example a DASD, is operating at a substandard level, the computer operating system should detect and indicate such to a user of the system to alert service personnel. In the case of a failed hard drive, the system might report "error reading drive X" (where "X" is the logical drive name) on the display console of the system, for example. In small desk-top computer systems, when such an error is reported, it is generally relatively easy for service personnel to locate the hard drive in question, and the related interface card device, since there is only one enclosure and typically only one or two hard drives provided.

With larger and more complex computer systems, such as servers for small and large office environments, typically more peripheral devices, hard drives, and associated backplanes and interface cards are used, and they may be disposed in separate chassis enclosures, also called "frames" or "towers," and "drawers" (self-contained entities which can be slid in and out of a chassis enclosure as a unit) forming an interconnected multi-tower system. In such systems, locating a device in need of servicing may be more difficult and/or time consuming, unless the operating system can indicate the location of the device in question by tower, backplane, and card-slot, for example. One computer system that is sometimes configured as a multi-tower computer system is the IBM AS/400 (IBM and AS/400 are trademarks of International Business Machines Corporation, all rights are reserved). The towers of this computer system in its multi-tower configuration are interconnected by at least one host system bus. However, even in a single tower system there may be a significant number of backplanes, each with a number of slots, making physically locating a particular "logical" device difficult and/or time consuming without first establishing a logical to physical location correlation.

The correlation for service has been accomplished in the past using a combination of a physical label at the 'bay' location within the computer enclosure which service personnel can refer to, and some 'boot-code' within the operation system. The 'boot-code' is generally loaded at the time of system manufacture and contains information about how the chassis was built, i.e., configured, at the time of manufacture.

However, a problem with this method is that changes to subsystem structures in the field are not reliable. The maintenance personnel adding/subtracting or changing chassis configuration in the field are relied on to input the newly affixed labeling information and structure into the operating system.

Typically, reconfiguration of a computer primarily consists of replacing hardware devices, such as DASD's (direct access storage devices—hard disk drives) or PCI (peripheral component interconnect) cards. In some cases, subsystems are also replaced during a system upgrade. For instance, a processor and memory 'cartridge' might be upgraded with a faster processor and more memory. However, additional information on how the physical box labeling layout might change as a result was often neglected.

At the present time, some manufacturers are conducting an initiative to 'standardize' the physical 'outside' dimensions of server boxes. For example, INTEL has an initiative called SHV for Standard High Volume servers. With standardization of the box volume, there comes a need to be able to re-label the enclosure components during a subsystem upgrade. Upgrading is desirable at the 'Server' box level, since these boxes are usually very expensive and, for inventory and other reasons, many users have a desire to maintain the Serial Number of the overall chassis while replacing the 'guts' of the machine to obtain better performance.

A system power control network (SPCN) is known from U.S. Pat. No. 5,117,430 and copending application Ser. No. 08/912,561, filed Aug. 18,1997, entitled "FAIL-SAFE COMMUNICATIONS NETWORK FOR USE IN SYSTEM POWER CONTROL" attorney docket number RO997-083-IBM-101. The SPCN communications network is a low volume serial network used to monitor power conditions at a plurality of nodes in a computer system, in particular, the IBM AS/400 (IBM and AS/400 are registered trademarks of International Business Machines Corporation). The nodes typically include microprocessors which monitor the status of, and make occasional adjustments to, the power conditions at the respective nodes.

It is further known to store vital product data (VPD) for correlating the physical locations of system components with their corresponding logical addresses in a computer system from the copending patent application Ser. No. 08/971,687, filed Nov. 17, 1997, entitled "METHOD AND APPARATUS FOR CORRELATING COMPUTER SYSTEM DEVICE PHYSICAL LOCATION WITH LOGICAL ADDRESS" attorney docket number RO997-154-IBM-108, assigned to the same assignee as the present application. As described therein, memory, e.g., non-volatile memory, is provided on a backplane and written with VPD information, such as the type of backplane, manufacture date, backplane serial number, type of slots on the backplane, etc., and this information is retained for use by the operating system if and when needed for service action, upgrades, or for on-line configuration management and order process.

Further, the VPD information may advantageously be accessed, for example, using an SPCN such as those which are disclosed in the above-mentioned U.S. Pat. 5,117,430 and in the other related application Ser. No. 08/912,561.

There is a need for a reliable means of sensing changes in chassis subsystems and updating software images with appropriate labeling information, through the operating system.

SUMMARY OF THE INVENTION

It is, therefore, a principle object of this invention to provide a method and apparatus for reassigning slot labels based on vital product data (VPD).

It is another object of the invention to provide a method and apparatus that solves the above mentioned problems so that an operating system (OS) is able to correlate a physical location, or 'bay', within a computer chassis with a device or subsystem at that location in order to be able to readily service or upgrade the system.

These and other objects of the present invention are accomplished by the method and apparatus disclosed herein.

According to an aspect of the invention, in an electrical system having subsystems, and which stores configuration labeling information therein, a method includes detecting subsystem configuration, and updating the stored configuration labeling information based on the detecting. Service personnel can access the stored configuration labeling information to use in affixing labels at appropriate locations in the electrical system.

According to an aspect of the invention, the subsystems have vital product data (VPD) storage associated therewith, and the detecting includes reading vital product data corresponding to each subsystem from the respective associated vital product data storage.

According to another aspect of the invention, the detecting is performed at predetermined times during operation of the electrical system. These predetermined times may include at initialization of the electrical system, during an electrical system service action (concurrent maintenance), and at regularly scheduled time intervals during the electrical system operation, for example.

According to another aspect of the invention, the electrical system is a computer system which includes a system power control network, and the reading is accomplished by the system power control network.

According to another aspect of the invention, configuration labeling information may be stored in the electrical system at the time of assembly of the electrical system with subsystems, subsystem configuration changes being detected at some time after assembly, and labeling information being updated.

According to another aspect of the invention, labeling information for a new subsystem may be derived from vital product data memory associated with the subsystem, from a distribution diskette provided by the manufacturer of the subsystem, or from an Internet web site associated with the subsystem manufacturer, for example.

According to another aspect of the invention, a method of maintaining system labeling in an electrical system having a plurality of subsystems, includes applying power to the subsystems, accessing a table having hardwired addresses and subsystem identification information for the subsystems, and querying the subsystems at the respective hardwired addresses for subsystem identification information. The subsystem information gathered in the querying is compared to the subsystem identification information stored in the table in order to detect subsystem changes, and make a determination if a subsystem change requires a change in system labeling. Maintenance personnel are signaled that a change in labeling is required if so determined.

According another aspect of the invention, there is provided an apparatus for maintaining slot labels.

These and other aspects of the invention will become apparent from the detailed description set forth below.

DETAILED DESCRIPTION OF THE PREFERRED EMBODIMENT(S)

Figure 1:
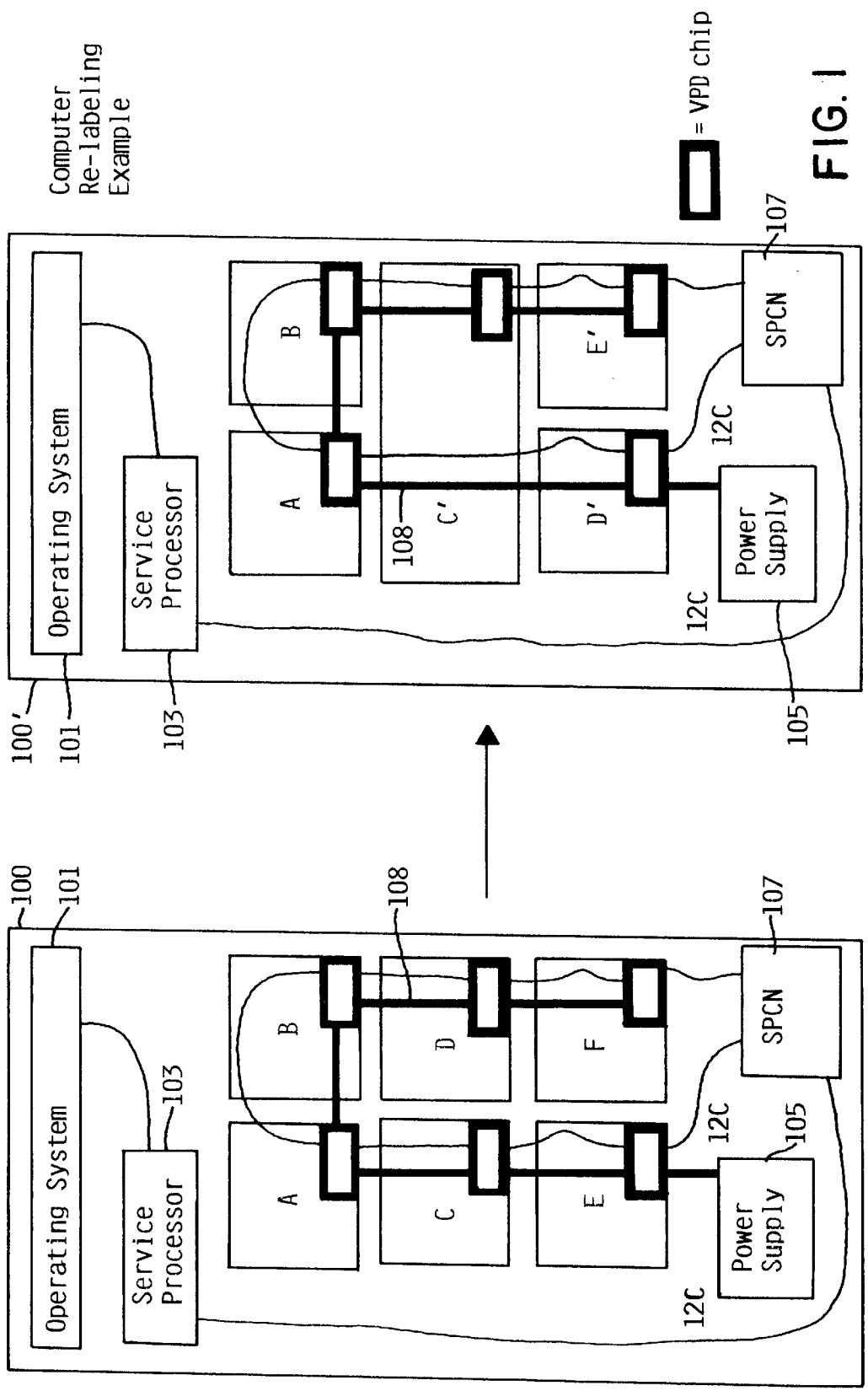
FIG. 1 illustrates an exemplary computer system with subsystems A–F reconfigured to have subsystems A–E, in which an exemplary embodiment of the present invention can be applied.

The invention will now be described in more detail by way of example with reference to the embodiment(s) shown in the accompanying figures. It should be kept in mind that the following described embodiment(s) is/are only presented by way of example and should not be construed as limiting the inventive concept to any particular physical configuration.

The invention provides a solution to the above mentioned problems and overcomes limitations in the existing systems. In particular, according to an exemplary embodiment of the invention, the SPCN (System Power Control Network) is provided with the capability of sensing any subsystem changes, e.g., a new subsystem installation, and assign new 'bay' or slot labels to VPD (Vital Product Data) memory chips contained within the new subsystems. SPCN establishes, for example, a reference table containing the correct labeling structure for a given subsystem Part Number which it has read from the VPD chip.

The VPD chips are preferably non-volatile memory, e.g., EEPROM (electrically erasable and programmable read only memory), NVRAM (non-volatile random access memory), Flash memory, or the like, so that the information stored therein is retained even when system power is removed. The VPD chips could less preferably be volatile memory whose contents are nonetheless retained when system power has been removed, for example, CMOS (complimentary metal oxide semiconductor) memory provided with a small dedicated long-life battery for retaining the contents when system power is removed.

The system power control network (SPCN) is provided with non-volatile memory (EEPROM) in which it retains system data, and the like. For example, SPCN reference tables which tabulate logical device to physical location information as described in co-pending application Ser. No. 08/971,687, docket IBM-108.

The SPCN reference tables are preferably loaded into SPCN's EEPROM memory at the time of manufacture, i.e., assembly, of the computer system. Alternatively, the reference tables are loaded as a prerequisite before a service action, such as to install a new sub-system, for example. The reference tables may require updating after concurrent (or other) maintenance, and are preferably checked to determine if any changes are required at initial program load (IPL), i.e., initialization of the system.

It should be noted that the computer Operating System (OS) generally would not maintain these reference tables. The OS generally has no direct means of knowing that a particular subsystem was placed at a particular physical location, and it is better to have SPCN do this so that it may optionally terminate an initialization (IPL) if an inappropriate configuration is detected, for example. Early in an initialization (IPL), the SPCN is able to sense a change in subsystem Part Number, for example, based on its physical 'hardwired' connection, and therefore is better suited to maintain these reference tables.

During initialization (IPL) of the computer system, the operating system establishes the logical address for each device in the system. The following summarizes this operation which is described in Ser. No. 08/971,687, filed Nov. 17, 1997, entitled "METHOD AND APPARATUS FOR CORRELATING COMPUTER SYSTEM DEVICE PHYSICAL LOCATION WITH LOGICAL ADDRESS" attorney docket number RO997-154-IBM-108.

Prior to IPL (initial program load), the SPCN can go sequentially through the network defining a unique enclosure (tower/frame/drawer) address for each computer system enclosure, and further go sequentially through all chassis field replaceable units (FRU) components (backplanes, power supplies, blowers, etc.) within each enclosure defining and/or retrieving unique addresses, and write the electronically determined addresses into an associated memory, in particular, VPD, of the SPCN node.

Each chassis FRU component therefore has its unique physical location address stored in local memory (VPD) thereon. During IPL, the operating system and SPCN build a logical mapping of the entire computer system by "walking its buses." Then the operating system can read the chassis FRU component physical location address information stored by SPCN in memory, and build a mapping of logical address to physical location address for each backplane. In this way, the operating system does not have to go through the time consuming polling operation as was required in prior systems.

Since the SPCN is functional immediately after power on, the physical location information is instantly available to the operating system at the time when the complete logical addresses are assigned. The SPCN memory already contains the physical location information which can be read by the operating system through, e.g., the primary functional path, i.e., the system bus. Further, SPCN provides a redundant path to the information which can be advantageous should there be a failure somewhere in the primary functional path preventing access to the physical location information.

Because of the writing of the physical location into SPCN memory, if a device error is reported prior to a reconfiguration of the system during concurrent maintenance (CM), for example, the device might still be located by its reported physical location.

The operating system and/or the system power control network (SPCN) uses the VPD memory for other information as well, in particular, vital product data (VPD), such as the type of FRU (field replaceable unit), the model number, etc. Conceptually, various input/output devices, adapter cards, direct access storage devices, backplanes, power supplies and blowers can all be considered "field replaceable units" (FRU's) since they are all units which can be serviced and/or replaced in the field. The VPD which may be stored in the memory, therefore, can relate to the backplane, any adapter card, or any input/output or storage device, etc., coupled thereto.

In some systems, such as those having multiple buses, it is very advantageous to store bus identification information in non-volatile memory associated with the backplane. In this way, should an enclosure be removed and relocated at a different position on a main bus, that is, be at a different logical bus "drop" point, a unique bus identifier persists in the memory, so that system bus configuration information can be maintained and updated in the operating system and memory. In such an arrangement, then, every system bus has an associated memory providing the information.

One underlying concept is that there is some local storage of physical location information, and that this information is accessible through the host operating system to build a logical to physical correlation. Another underlying concept is that there is a mechanism through which the enclosure/ backplane information can be written into local storage without burdening the operating system. As was described above, it is contemplated that this mechanism is the SPCN, however, other mechanisms could be used within the spirit of the invention.

Non-volatile random access memory (NVRAM) is preferably used to store the information mentioned above. An advantage of using NVRAM is that, when installed on a particular PCI backplane, for example, besides being written with slot information, the NVRAM can be written with vital product data information, such as the type of backplane, manufacture date, backplane serial number, type of slots on the backplane, etc., and this information will be retained for use by the operating system if and when needed for service action, upgrades, or for on-line configuration management and order process.

The above envisions using non-volatile random access memory (NVRAM) for storing at least the slot information, however it is not limited to using any particular type of non-volatile memory. For example, CMOS memory, various types of programmable read only memories (PROM's), or so-called Flash memory could be used as the non-volatile memory.

Further, for computer systems where it is known that the system configuration will not change, all of the physical location information, i.e., enclosure, backplane, slot, and labels could be pre-stored in ROM. That is, the writing into memory of enclosure and backplane location information would be done only once at the time of system manufacture and configuration, as with the slot information.

On the other hand, where system configuration could be relatively dynamic, volatile or non-volatile random access memory (NVRAM) may be the best choice for storing of enclosure/backplane information. Since this location information can be written relatively quickly at startup or reset, the volatile or non-volatile random access memory associated with the already present bridge circuits may be a desirable choice.

Further, the location information is stored in memory disposed on each backplane, and this is considered preferable, that is, having the location information stored in memory on a field replaceable unit, such as a backplane. One reason is that when upgrading of bridge circuits is performed, for example, which are located on the backplane, the VPD information, stored in the local memory, needs to be changed as well. Having the memory located on the backplane along with the bridge circuit is therefore more robust for upgrading procedures.

However, the location information could be locally stored in memory at other places in an enclosure, for example, in situations where for one reason or another, backplane space is strictly limited. For example, the respective location information could be stored in memory disposed somewhere in the associated enclosure, but not on the backplane or backplanes, e.g., in the SPCN node itself. Or the respective location information could be stored in memory disposed on one or more of the card devices plugged into the respective slots on a backplane. The operating system could then read out the location information as it polls the devices in the system during IPL.

The memory for storing the location information could be provided anywhere within an enclosure so long as there is a coupling to SPCN to write the enclosure/backplane location information, and to the system bus for reading the information. The exact configuration may depend on a variety of technical and/or economic factors, such as cost, complexity, and compatibility with existing hardware. The above takes advantage of already existing structures and devices, e.g., the bridge circuits. Of course, for the previously discussed reasons, providing the memory on the backplane is the preferred implementation.

While in the above description, the location information is disclosed as being written during initialization of the system, it is not limited to this scenario. For example, the information could be obtained and written into memory whenever a slot device is added, replaced or removed from a backplane, or whenever an enclosure is added, removed or replaced in the computer system.

With the advent of so-called "hot-pluggability" for the PCI bus standard, in which devices or even whole backplanes can be plugged-in and removed while the system is still running, real-time correlation is needed to retain proper hardware resource information in the operating system. The above provides a mechanism to quickly and efficiently serve this need. The correlation operation could be initiated by the system operator or maintenance personnel, or could be set off when a periodic poll by the SPCN network determines a hardware change has been made, for example.

During system IPL, or alternatively, during a system service action, such as concurrent maintenance, the bootcode or service software within the Operating System (OS), can update its Hardware Resource system image based on reading the SPCN provided reference tables. The OS builds the new system image from the new labeling information obtained from SPCN EEPROM, for example, or alternatively, somewhat less directly by combining individual subsystem labels from each of the subsystem VPD EEPROM's.

Reference is now made to FIG. 1 which shows an exemplary computer system before a subsystem change (100) and after a subsystem change (100'). The computer system 100/100' has an Operating System (OS) 101, a Service Processor (SP) 103, a Power Supply (PS) 105, and an SPCN node 107. Before reconfiguring, the computer system 100 has six subsystems labeled A through F. Connections are illustrated between the operating system 101 and the service processor 103; the service processor 103 and the SPCN node 107; the power supply 105 and subsystems A to F; and respective Vital Product Data (VPD) chips on each subsystem A to F.

The VPD chips contain subsystem specific data, including a unique subsystem part number for their respective subsystem. The stored information in the VPD chips is accessed and used by SPCN for example as described in the related copending application Ser. No. 08/971,687, filed Nov. 17, 1997, entitled "METHOD AND APPARATUS FOR CORRELATING COMPUTER SYSTEM DEVICE PHYSICAL LOCATION WITH LOGICAL ADDRESS" attorney docket number RO997-154-IBM-108. For the purposes of the present application, it is sufficient to state that the VPD information can uniquely identify a subsystem by part number, and physical location/connection. Physical location information may include enclosure, backplane within the enclosure, and slot on the backplane, where the subsystem in question is located. The idea is to provide enough location information to enable service personnel to locate and service a particular subsystem if needed. While an individual subsystem may have a number of component parts, each having its own respective part number, i.e., there may be multiple part numbers comprising a 'subsystem', one unique part number for the subsystem is chosen which would always be identified with the physical volume within the box pointed to by the label.

For instance, one of the subsystems A through F could represent a processor, DASD, or PCI backplane. A subsystem could have other additional labeling within the subsystem to identify particular device positions, e.g., slots, as well. While these slots can also be re-labeled in a similar fashion as the subsystem, they might represent configuration changes to the subsystem that do not necessarily require any change in the physical space taken up by the subsystem itself. It may be, therefore, that the subsystem label is unchanged, but the slot label information on the subsystem needs updating. In any case, subsystem labels and slot labels can be correlated and updated as required using the SPCN stored reference tables.

Figure 3A:
FIG. 3 illustrates exemplary system labels.
Figure 3B:
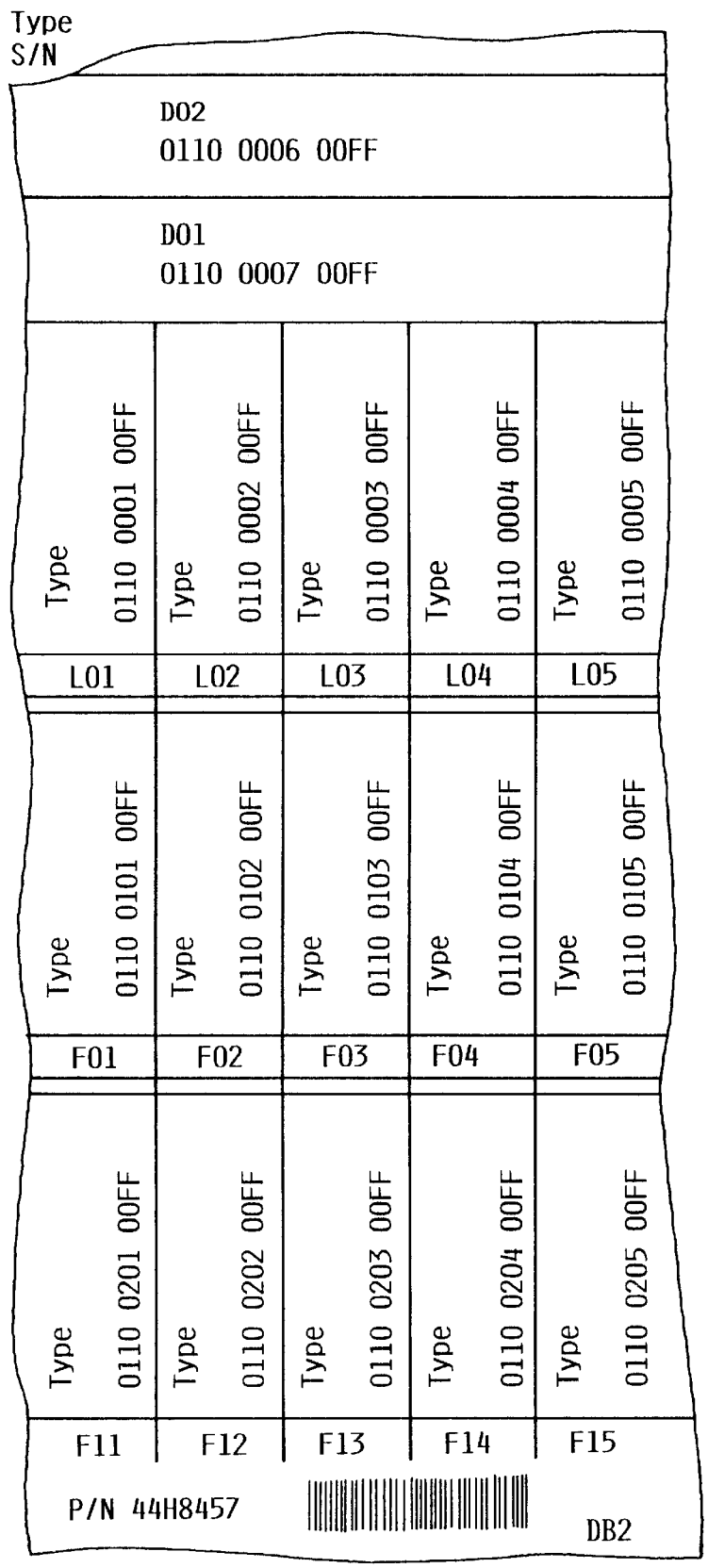

FIG. 3 illustrates exemplary labeling information as it might be printed for a typical computer system. The particular labels shown are for a DASD (direct access storage device - disk drive) backplane, hence the indication "DB1" and "DB2" for DASD Backplane 1 and 2, respectively. The "type" would be the type of DASD, for example. Typically, on the inside of a front or side panel of a computer system enclosure, an enclosure configuration diagram is depicted, and space on the diagram is available for device labels. When a device is changed, a new label associated with the changed device may simply be stuck on top of the old information at the appropriate place on the diagram. These diagrams aid in performing service and/or upgrade operations, for example, by providing a map of the particular enclosure that the customer engineer (CE) can use. Sometimes labels are placed directly on or adjacent to the bay where a respective device is attached.

It can be appreciated that since the labeling is primarily to aid service personnel (CE) in physically locating a particular subsystem, e.g., a FRU (field replaceable unit), for maintenance or upgrading, for example, the labeling information and hierarchy may be dependent on what can be serviced as a unit, and/or what can serve as a location identifier, or both. For example, a particular backplane would preferably have a label associated with it both because it is a replaceable as a unit, and because it serves to help locate other devices (FRU's) which may be plugged-in at slots on the backplane. The labeling would also preferably be correlated with what the operating system (OS) recognizes as a logical device or construct. For example, the operating system may recognize logical drives C, D and E, which are really one physical unit (FRU), i.e., a DASD (direct access storage device—disk drive) that has been partitioned into several logical drives.

As another example, the operating system may have an address space that spans a number of different devices, e.g., ROM (read only memory) chips and RAM (random access memory) chips, which may be arranged in banks. A particular memory location which the operating system reports as being faulty should be readily identifiable to service personnel as being, for example, in a particular chip, on a particular memory board, attached to a particular backplane, in a particular enclosure. With enclosure, backplane, and memory board labeling information, service personnel can readily find and replace a memory board with a faulty chip. Such labeling details are presented by way of example only. How a particular labeling hierarchy is arrived at would be dependent on the particulars of system configuration, and is within the understanding and abilities of one skilled in the art.

Returning to FIG. 1, the case where subsystems C and D in computer 100 are removed and a single subsystem C' of different physical dimensions in the reconfigured computer 100' is added, will be explained. Such a situation clearly suggests the need for re-labeling. It may be that subsystems C and D are no longer present as separate physical units in reconfigured computer 100' but are integrated as subsystem C'. As an example of such a change, subsystems C and D in original computer 100 could have been, for example, a hard drive controller and its associated hard drive, which are being replaced by an integrated controller/drive, e.g., a "hard-card." Or perhaps, subsystem C was a serial I/O (input/output) controller card and subsystem D was a parallel I/O controller card, which is being replaced by a combined serial and parallel I/O card C'. Alternatively, it could be that subsystem D is simply no longer needed, and subsystem C is being upgraded to a newer subsystem C'. Further, subsystems E and F are now subsystems D' and E' in the reconfigured computer 100'. Regardless of the reason for the reconfiguration, re-labeling is needed to maintain a coherent structure for the reconfigured computer 100'.

In this illustrated example, the existing hardwired cable 108 between subsystem VPD chips is reused. Cable 108 provides the means by which the VPD chips obtain addresses that SPCN uses to communicate with those chips. In this communication, the voltage logic levels equal GND (logic 0) and +3.3V or +5V (logic 1), for example. Implementation of the VPD chips can be using Philips Semiconductors parts, such as the 8051 processor family, or individual EEPROM's that contain non-volatile memory and are connected to an I2C bus.

As can be observed, in the illustrated example, the physical connection to the new subsystem C' in the reconfigured computer 100' was formerly connected to subsystem D in original computer 100. Of course this is detail is not limiting, i.e., the former connection to subsystem C could have been used instead.

In operation, SPCN would recognize the different part number located at this connection, and present the Operating System with a new labeling structure. The service personnel could then reliably query the computer to get directions on how to re-label the new subsystem C' and re-label the old subsystems E and F to D' and E'.

Of course, in the case of concurrent maintenance, for example, SPCN recognizes when subsystems C and D have been removed and new subsystem C' has been plugged, and can report this immediately to the operating system so that the operating system can reconfigure its hardware resource system image, through service software reading updated SPCN reference tables, for example, as mentioned above.

Figure 2A:
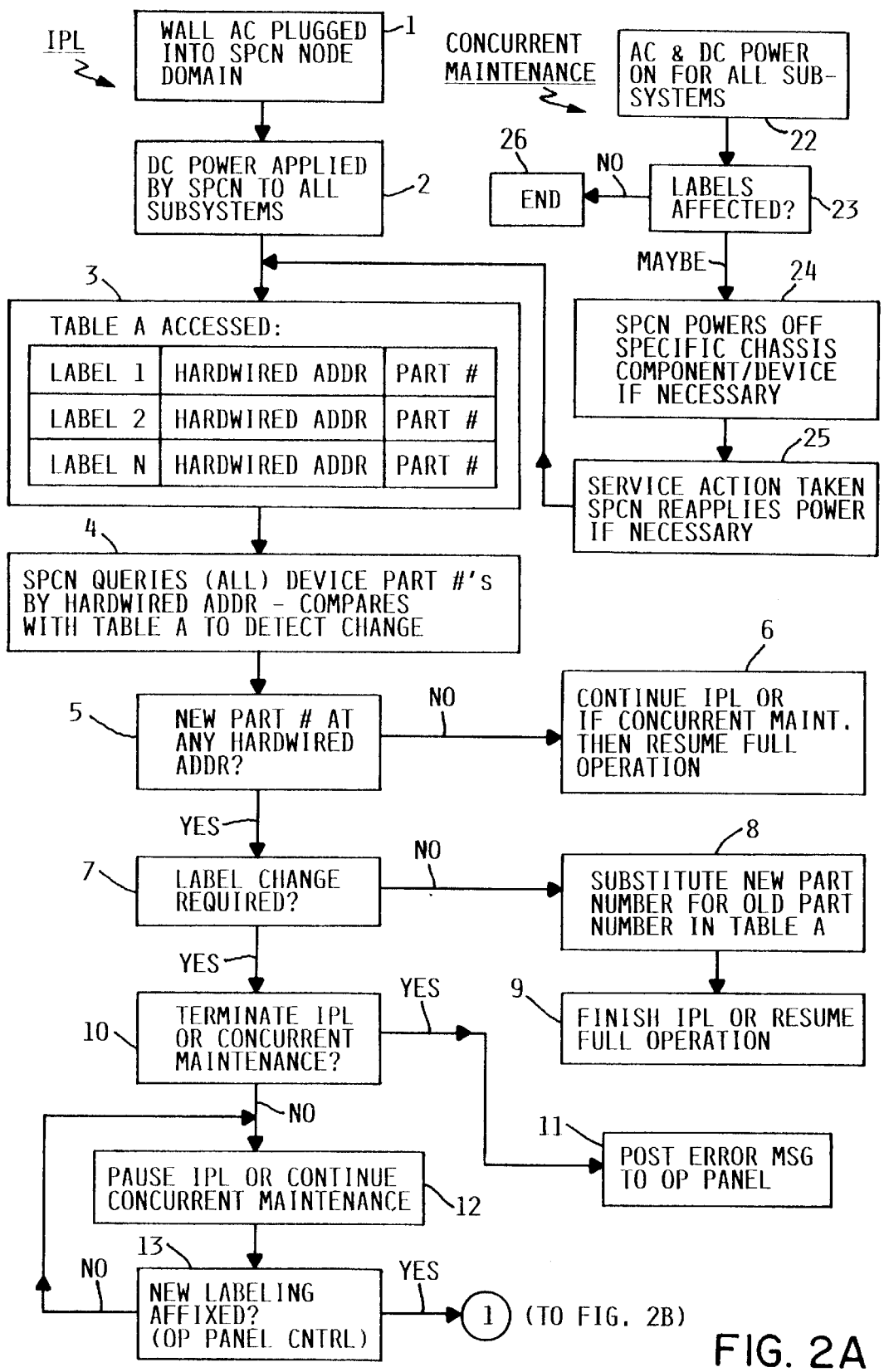
FIGS. 2A and 2B form a flow chart illustrating an exemplary method according to an embodiment of the invention.
Figure 2B:
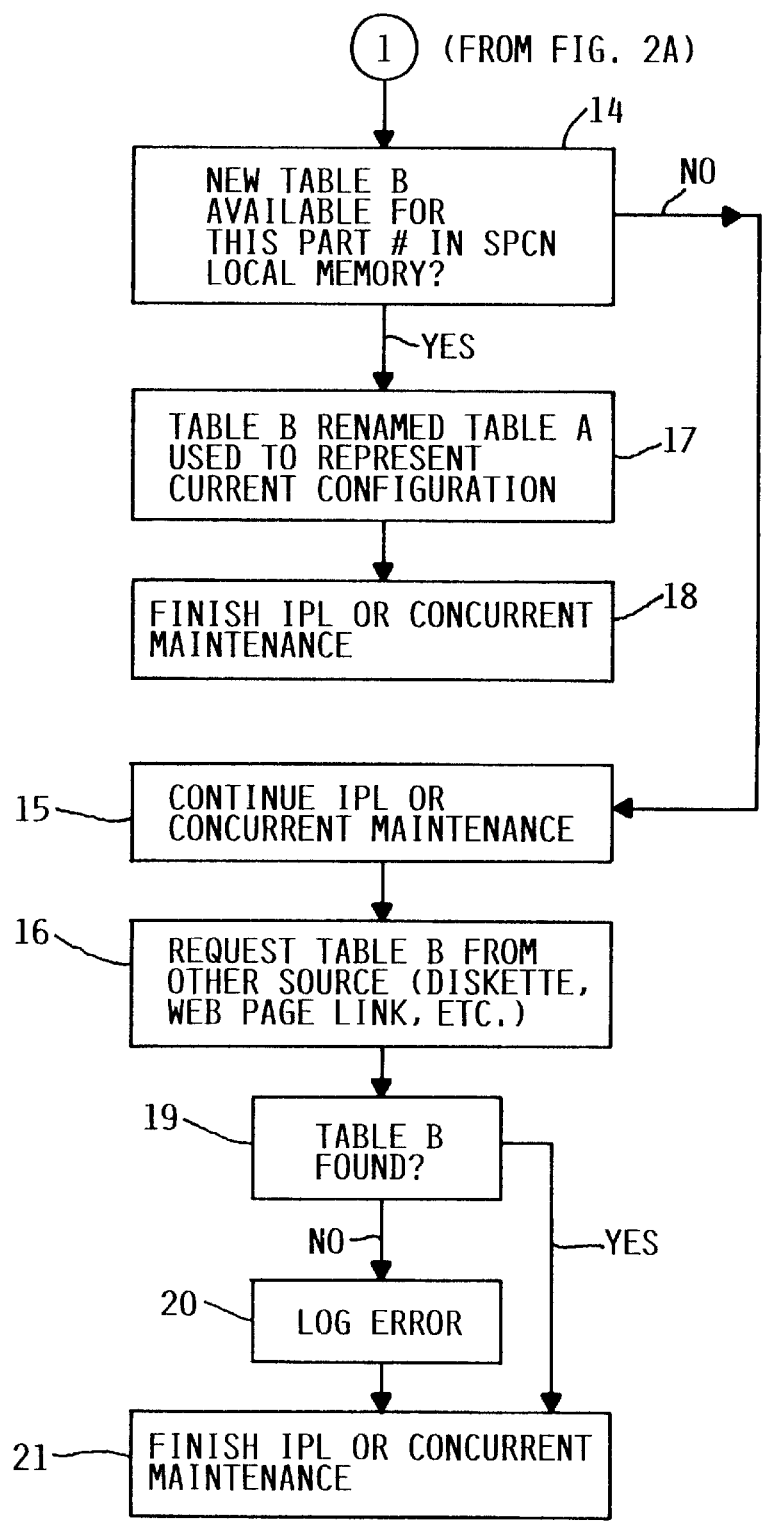

Referring now to FIGS. 2A and 2B, a flow chart is presented illustrating an exemplary implementation of a labeling maintenance method according to the invention. Initially, beginning with block 1 of FIG. 2A, operation during an IPL will be explained. First, the wall AC is plugged into the SPCN node domain. DC power is applied by SPCN to all subsystems in block 2. Table A is accessed in block 3. Table A may be as simple as a three column table with the first column containing Label N, the second column a hardwired address (as opposed to a logical address), and the third column containing the part number of the device. (If this were a concurrent maintenance operation, only the particular hardwired address of the device being serviced might need to be accessed from the table.)

The information in the table would preferably be stored in read/write non-volatile random access memory (NVRAM) in the SPCN node, however, other locations, such as disk storage, or network storage are also possible.

In block 4, SPCN queries all the devices in the system by their hardwired address and gathers their respective part numbers, to see if the part numbers correspond to those already stored in table A, as indicated by test point 5. If there is a lack of correspondence, that is, if a new part number is detected as installed at any hardwired address, this indicates a device has been changed. (In a concurrent maintenance operation, only the device or devices affected by the service would need to be queried for a part number change.)

If there is no new part number detected, the IPL continues or, if this is a concurrent maintenance operation situation, then the system resumes full operation with the serviced device at block 6. However, if a new part number is detected at decision point 5, then flow proceeds to decision point 7, where a test is made to determine whether any change to the labeling, e.g., chassis bay labeling, is required because of new part numbers detected.

If no label change is required because, for example, even though there is one or more new part numbers, the device or devices replaced and the new device or devices substituted are otherwise identical, or entirely functionally equivalent, then flow proceeds to block 8, where the new part number or numbers are written into table A in place of the old part number or numbers (of the device or devices replaced). Once the part number or numbers have been written in table A, the IPL can proceed to conclusion, or the system return to full operation if this was a concurrent maintenance situation, as indicated at block 9.

However, if a change in labeling is required as determined at decision point 7, then flow proceeds to decision point 10. Here, a decision is made whether to terminate the IPL (or the concurrent maintenance) because of the change and post an error message to the operator panel at block 11, or to pause the IPL (or continue the current maintenance) at block 12, while the service personnel replaces the required labeling.

A reason for terminating the IPL (or concurrent maintenance) might be because a the new device having the new part number is incompatible with the computer system, for example. In that case, the service personnel would be notified at the operator panel by the error message and would have to take corrective action before the system could be initialized or operation resumed.

At decision point 13, the process tests for an indication from the operator panel, for example, that the new labeling has been affixed, and the IPL remains paused (concurrent maintenance continues) until such a notification is detected. Of course, a timer could be started which resumes the IPL, or full operation, after a period of time under the assumption that the service personnel have simply forgotten to send the notification to the system and further delay is unnecessary. A reminder message to affix the new labeling could be generated in such a case.

After leaving decision point 13, flow next goes to decision point 14 (see FIG. 2B), where the process looks for a new table B for the new part number in SPCN local memory. Table B contains the updated information about the new device associated with the new part number.

If the result of the decision block 14 is the table B is available in SPCN local memory, then flow proceeds to block 17, where table B is used to represent the current configuration, and then to block 18 where the IPL proceeds to completion (or full operation resumes ending concurrent maintenance operation). That is, Table B is renamed Table A and subsequently used in place of the previous Table A.

If the table B is not available, flow proceeds to block 15 to continue the IPL (or concurrent maintenance), and then to block 16 where SPCN initiates a request for Table B from a diskette, or a web site, for example. The request could be through the operating system or directly depending on how SPCN is configured. If the table is found, as tested for at decision point 19, then the IPL proceeds to finish (or full operation resumes ending concurrent maintenance operation) at block 21. However, if the table B with the updated information about the new device is not found as tested for at 19, then the IPL (or concurrent maintenance) proceeds to finish with an error logged at block 20.

In the above description, reference was made to operation in the case of a concurrent maintenance situation. In particular, a concurrent operation would begin at block 22 with the AC and DC power on and all subsystems powered up. Decision point 23 tests whether the concurrent maintenance operation affects labeling, e.g., a new part is going to be added, and if there is a possibility (MAYBE), then flow proceeds to block 24.

At block 24, if necessary, the SPCN powers off a specific chassis component/device affected by the concurrent maintenance, and then in block 25, the service action is taken after which SPCN reapplies power, if appropriate. If the device is hot-pluggable, then the power need not be turned off during the concurrent maintenance and back on at its conclusion. Flow proceeds into block 3 and through the process blocks already described above.

If however, decision point 23 determines that labeling will not be affected by this concurrent maintenance operation, e.g., the operation is only an inspection and there will be no change of parts, then this labeling maintenance routine ends at block 26.

It will be apparent to one skilled in the art that the manner of making and using the claimed invention has been adequately disclosed in the above-written description of the preferred embodiment(s) taken together with the drawings.

It will be understood that the above described preferred embodiment(s) of the present invention are susceptible to various modifications, changes, and adaptations, and the same are intended to be comprehended within the meaning and range of equivalents of the appended claims.

Further, although a number of equivalent components may have been mentioned herein which could be used in place of the components illustrated and described with reference to the preferred embodiment(s), this is not meant to be an exhaustive treatment of all the possible equivalents, nor to limit the invention defined by the claims to any particular equivalent or combination thereof. A person skilled in the art would realize that there may be other equivalent components presently known, or to be developed, which could be used within the spirit and scope of the invention defined by the claims.

What is claimed is:

1. In an electrical system having subsystems, and which stores configuration labeling information therein, a method comprising:

detecting subsystem configuration; and updating the stored configuration labeling information based on the detecting;

whereby service personnel can access the stored configuration labeling information to use in affixing labels at appropriate locations in the electrical system.

2. The method according to claim 1, wherein the detecting is performed at initialization of the electrical system.

3. The method according to claim 1, wherein the detecting is performed at predetermined times during operation of the electrical system.

4. The method according to claim 3, wherein the predetermined times during operation of the electrical system are selected from the group including:

initialization of the electrical system;

during an electrical system service action; and regularly scheduled time intervals during the electrical system operation.

5. The method according to claim 1, wherein the electrical system includes a computer system;

wherein the detecting is performed at predetermined times during operation of the electrical system;

wherein the subsystems have vital product data (VPD) storage associated therewith; and wherein the detecting comprises reading vital product data (VPD) corresponding to each subsystem from the respective associated vital product data storage.

6. The method according to claim 5, wherein the computer system includes a system power control network (SPCN); and wherein the reading is accomplished by the system power control network.

7. The method according to claim 6, wherein the vital product data storage comprises non-volatile memory, wherein the subsystem configuration comprises subsystem location information, and wherein the method further comprises:

writing the subsystem location information in the non-volatile memory with the system power control network.

8. The method according to claim 7, wherein the system power control network comprises system data storage, and wherein the writing comprises writing the subsystem location information in the system data storage.

9. The method according to claim 1, wherein the configuration labeling information is stored in the electrical system at the time of assembly of the electrical system having subsystems, and wherein the detecting comprises:

detecting subsystem configuration changes at some time after assembly.

10. The method according to claim 1, wherein the detecting subsystem configuration and updating stored labeling information based on the detecting is performed during initialization of the system and during a concurrent maintenance operation;

wherein the updating the stored configuration labeling information is performed by one of:
reading vital product data from memory associated with a subsystem;
reading vital product data from a distribution diskette provided with an associated subsystem; or
reading vital product data from an Internet web site address associated with a subsystem.

11. A method of maintaining system labeling in an electrical system having a plurality of subsystems, comprising:

accessing a table having hardwired addresses and subsystem identification information for the subsystems;

querying the subsystems at the respective hardwired addresses for subsystem identification information;

comparing subsystem identification information gathered in the querying to subsystem identification information stored in the table to detect a subsystem change;

determining if a subsystem change detected by the comparing requires a change in system labeling;

signaling that a change in system labeling is required if so determined by the determining.

12. The method according to claim 11, wherein if the comparing detects a subsystem change, and the determining determines that there is no system labeling change required, then the method further comprises:

updating the table with the gathered subsystem identification information associated with the subsystem change.

13. The method according to claim 11, wherein when the determining determines that a system labeling change is required, prior to the signaling that a change in system labeling is required, the method further comprises:

deciding whether the subsystem change is acceptable or unacceptable; and if the subsystem change is unacceptable, generating an error message.

14. The method according to claim 11, further comprising suspending system operation until an input is received indicating that the required system labeling has been effected.

15. The method according to claim 14, wherein if no input is received indicating that the required system labeling has been effected within a predefined time period, a message is generated and system operation is resumed.

16. The method according to claim 14, wherein after the input is received indicating that the required system labeling has been effected, and system operation has resumed, the method further comprises:

searching for new table information associated with the subsystem change.

17. The method according to claim 16, wherein if the new table information is not found, the method further comprises:

logging an error.

18. The method according to claim 16, wherein the electrical system comprises a computer system having a plurality of subsystems and a system power control network, and wherein the searching for the new table information comprises at least one of:

searching memory associated with the system power control network;

searching removable storage media; and searching an internet site.

19. An initialization method for initializing an electrical system including the method of maintaining system labeling according to claim 11.

20. An apparatus for maintaining labeling information in an electrical system having a plurality of subsystems, comprising:

a system power control network coupled to the plurality of subsystems, and having at least one node;

storage means in the at least one node, for storing labeling information which includes a hardwired address for each subsystem and associated subsystem identification information for each subsystem;

retrieving means in the at least one node, for retrieving subsystem identification information from a subsystem at a respective hardwired address;

comparing means in the at least one node, for comparing the subsystem identification information retrieved with the labeling information in the storage means to detect any difference; and updating means in the at least one node, for updating the labeling information when the comparing means detects a difference.

* * * * *

UNITED STATES PATENT AND TRADEMARK OFFICE
CERTIFICATE OF CORRECTION

PATENT NO. : 6,427,176 B1
DATED : July 30, 2002
INVENTOR(S) : Neil Clair Berglund et al.

It is certified that error appears in the above-identified patent and that said Letters Patent is hereby corrected as shown below:

Column 12,
Line 58, after "system", delete "." and insert --; wherein the subsystems have vital product data (VPD) storage associated therewith, and wherein the detecting comprises reading vital product data corresponding to each subsystem from the respective associated vital product data storage. --

Signed and Sealed this

Seventeenth Day of December, 2002

JAMES E. ROGAN
*Director of the United States Patent and Trademark Office*